(No Model.) 2 Sheets—Sheet 1.

F. BÄYER.
ELECTRIC BATTERY.

No. 514,115. Patented Feb. 6, 1894.

WITNESSES:
Frank S. Ober
Alfred W. Van Zee

INVENTOR
Frank Bäyer
BY
Baldwin, Davidson & Wight
ATTORNEYS.

THE NATIONAL LITHOGRAPHING COMPANY,
WASHINGTON, D. C.

(No Model.) 2 Sheets—Sheet 2.

F. BÄYER.
ELECTRIC BATTERY.

No. 514,115. Patented Feb. 6, 1894.

WITNESSES:
Frank S. Ober.
Alfred W. Van Zee.

INVENTOR
Frank Bäyer
BY
Baldwin, Davidson & Wright
ATTORNEYS.

UNITED STATES PATENT OFFICE.

FRANK BÄYER, OF NEW YORK, N. Y., ASSIGNOR OF ONE-HALF TO THOMAS B. WILLSON, OF SAME PLACE.

ELECTRIC BATTERY.

SPECIFICATION forming part of Letters Patent No. 514,115, dated February 6, 1894.

Application filed August 24, 1893. Serial No. 483,975. (No model.)

*To all whom it may concern:*

Be it known that I, FRANK BÄYER, a subject of the Emperor of Germany, at present residing in New York city, in the county and State of New York, have invented certain new and useful Improvements in Electric Batteries, of which the following is a specification.

The objects sought to be accomplished by the invention are to impart to galvanic cells large output of current, facility of changing and cleaning the cells, minimum of internal resistance, and changeableness of output; and the construction by which these desirable features are attained will be understood by reference had to the accompanying drawings in which—

Figure 1:
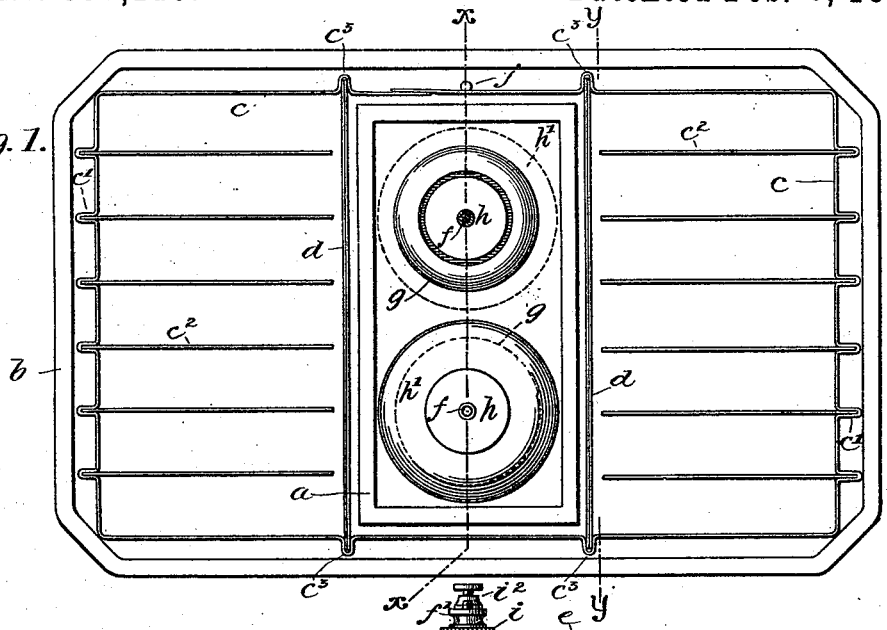
Figure 2:
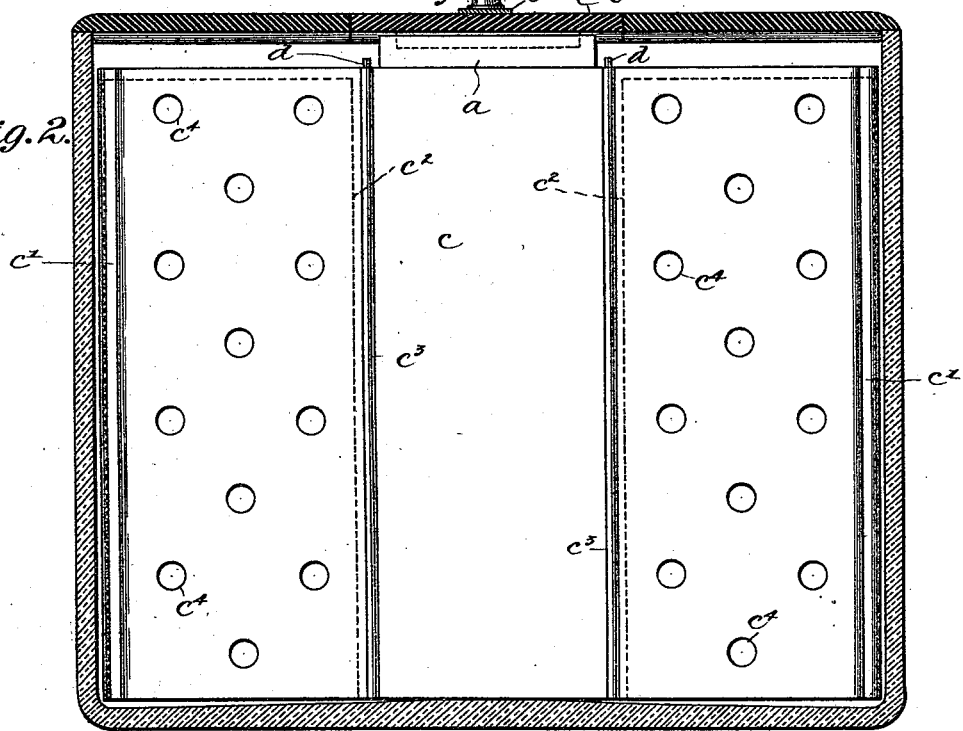
Figure 3:
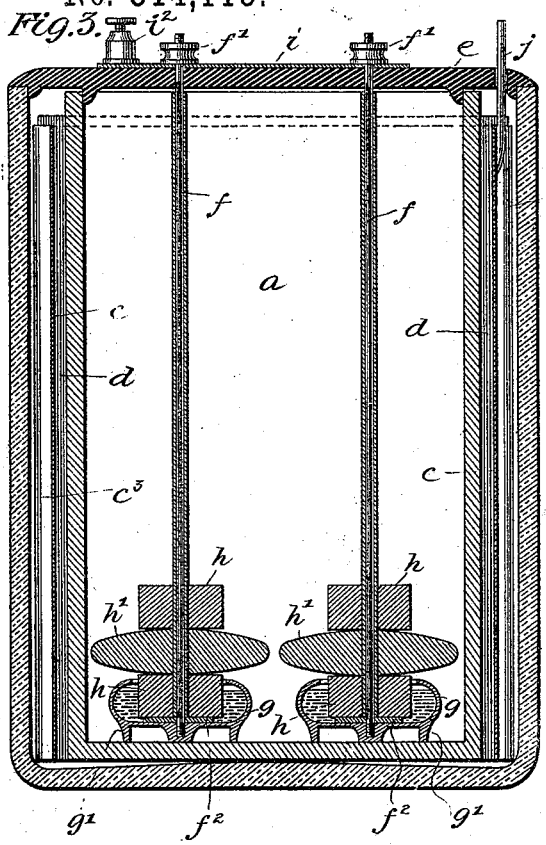
Figure 4:
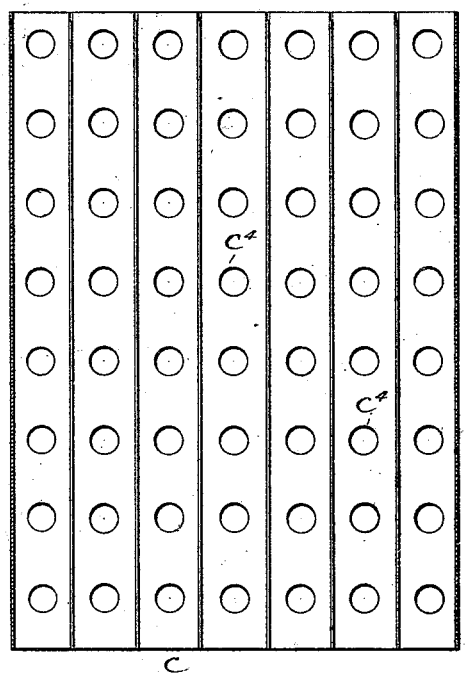
Figure 5:
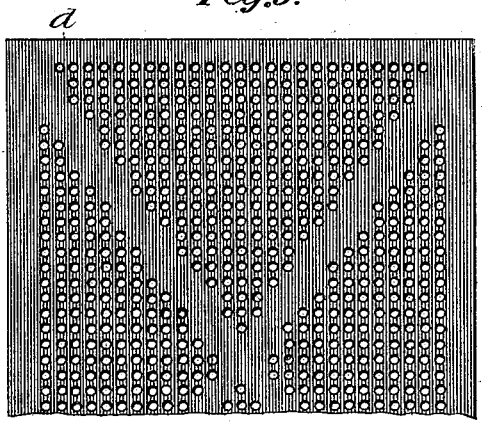

Figure 1 is a plan view of a galvanic cell made according to my invention. Fig. 2 is a side elevation showing the containing jar in section. Fig. 3 is a transverse section of the cell taken on the line $x, x$, Fig. 1. Fig. 4 is a section of the negative electrode on the line $y, y$, Fig. 1. Fig. 5 is a portion of one of the non-active partitions; and Fig. 6 shows a modification of the negative electrode.

The style of battery cell in which my improvements are embodied is shown in the drawings rectangular in form, the porous cup $a$ being placed in the center of the containing jar $b$, and the copper negative electrode formed to occupy the spaces in the jar on each side of the porous cup. This negative electrode is composed of a sheet of copper $c$ bent as shown to be in close proximity to the walls of the jar $b$, the parts of it at the ends of the jar being formed with double bends $c'$ $c'$, to form grooves in which are placed and held, parallel to one another and to the front and rear sides of the part $c$, the plates of copper $c^2$ $c^2$. The front and rear sides of the part $c$ are also formed with double bends $c^3$, $c^3$, adjacent to the porous cup $a$, thus constituting grooves in which are placed the partitions $d$ $d$ made of insulating or non-active material, said partitions being thus held between the porous cup and the inner ends of the plates $c^2$ $c^2$. These partitions are perforated as shown in Fig. 5, or in any suitable manner, said perforations being sufficiently numerous and of a size to admit of the free circulation of the solution surrounding the negative electrode to the porous cup, but not so large as to allow the crystals of the salt placed between the plates $c^2$ $c^2$ to pass through into the central portion of the jar. The part $c$ of the negative electrode is also provided with perforations $c^4$ $c^4$ for the free circulation of the solution to all parts of this electrode.

Figure 6:
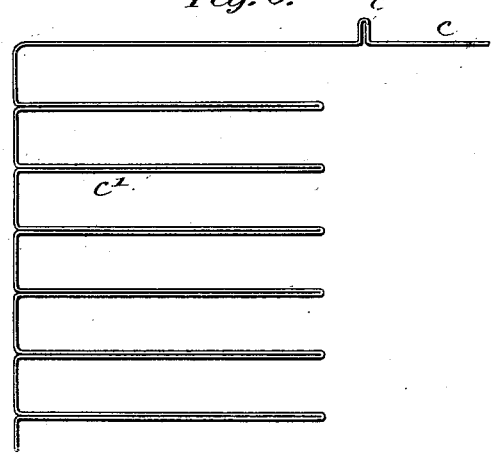

Instead of making the double bends $c'$ $c'$ in the sheet of copper and placing the separate plates $c^2$ $c^2$ therein, as shown in the main views of the drawings, they may be formed inwardly as shown at $c^5$ $c^5$, Fig. 6, and be of a width equal to the width of the plates $c^2$ $c^2$, said dividing and active surface plates and the main portion of the negative electrode being in this case integral.

To facilitate charging and cleaning the battery the cover is formed in three parts, the part $e$ covering and protecting the porous cup $a$ and positive electrode and the parts $e'$ $e'$ covering the ends of the jar and protecting the negative electrode.

The positive electrode is composed of a number of pieces of zinc readily applied to and detached from the battery, and so shaped as to present a relatively large surface to the salt or acid solution placed in the porous cup $a$. To the part $e$ of the cover are secured the metal rods $f$ $f$ by means of the thumb nuts, $f'$ $f'$, and these rods $f$ $f$ are provided near their lower ends with metal plates $f^2$, $f^2$, and to their extreme ends are secured the cups $g$ $g$ of insulating material, formed to hold mercury, in which are immersed the plates $f^2$, $f^2$, and the lower ends or bottom, pieces of zinc constituting the positive electrode. The rods $f$ $f$ are coated with a suitable insulating material so that the blocks or pieces of zinc $h$, $h'$ strung thereon have metallic connection therewith only through the plates $f^2$, $f^2$. These blocks or pieces of zinc $h$ and $h'$ differ in form, the blocks $h$ $h$ being cylindrical and of a size to set in the cups $g$ $g$ and the alternate ones $h'$ $h'$ circular with rounded sides and of a larger diameter than the blocks $h$ $h$. The high central parts of the blocks $h'$ $h'$ while affording sufficient contact surface between the blocks leaves spaces between them, thus exposing a large portion of their surfaces to the solution. Two rods with their accompanying blocks of zinc are shown; any number may be used according to the size of the cell. These rods $ff$ connect with the bar $i$ secured to the cover $e$ and to the binding post $i^2$. The positive terminal of the battery may be a wire $j$ secured to any part of the negative electrode, arranged to pass up through one of the parts $e'$ $e'$ of the cover. Upon removing the cover $e$ the zincs are lifted out of the porous cup and may be readily cleaned, and by simply unscrewing the thumb nuts $f'$ $f'$ the rods $ff$ may be detached from the cover for renewal or adjustment of the zinc blocks $h$ $h'$. The size of the positive electrode may be readily changed by simply varying the number of blocks $h$ $h'$. The object of making the partitions $d$ $d$ of an insulating material is to insure the holes therethrough always remaining open. If they were made of a conducting material and were in contact with the negative electrode the holes would in course of time become closed by the deposition of copper.

The mercury holding cups $g$ $g$ have annular projections $g'$ formed on their under side, thus constituting bases upon which they rest when removed from the battery, holding the electrodes in vertical position, and when the zincs are removed the mercury remains in the cups and is not liable to be wasted as would occur if it were placed in the bottom of the porous cup, as is sometimes done. The mercury insures a perfect amalgamation and a perfect contact between the adjoining blocks of zinc.

I claim as my invention—

1. The combination of the containing jar, the negative electrode arranged to occupy the two ends thereof, the porous cup placed in the central portion of the jar, the positive electrode in the porous cup and a perforated non-active plate at each side of the cup acting as a barrier to crystals of salt contained in the two ends of the containing jar.

2. A negative electrode for galvanic batteries consisting of a sheet of metal shaped to set in the containing jar of the battery, and bent upon itself so as to form grooves in which internal plates of the same metal are seated the plate serving to divide the active solution space into sections, and thus present a greatly increased active surface to said solution.

3. A negative electrode for galvanic batteries consisting of a sheet of metal formed to set in the containing jar of the battery, and having double bends in its sides, and plates of metal set in and held by the grooves formed by the double bends.

4. The combination of a rectangular sheet metal negative electrode having two grooves in its two opposite sides formed by double bends made therein, two perforated partitions set in these grooves and dividing the interior of the negative electrode into three compartments, and a porous cup and positive electrode located in the central compartment.

5. The combination of a rectangular sheet metal negative electrode having two grooves in its two opposite sides formed by double bends made therein and double bends formed in its two ends, plates of metal held in the groove formed by the bends in its two ends, two perforated non-active partitions set in the side grooves and dividing the interior of the negative electrode into three compartments, and a porous cup containing a positive electrode located in the central compartment.

6. In a positive electrode for galvanic batteries the combination of a central insulated rod and insulated cup containing mercury on its lower end, and blocks of zinc strung on the rod, the lower block lying in the mercury.

7. The combination of a supporting rod, and two sets of blocks of zinc strung thereon, one set being cylindrical in form and the alternate ones circular with rounded sides the whole constituting a positive electrode for galvanic batteries.

8. The combination of an insulated supporting rod, an insulated cup containing mercury on the lower end of the rod, and two sets of blocks of zinc strung on the rod, one set being cylindrical in form and the alternate ones of larger diameter and formed with rounded sides.

9. The combination of a rectangular sheet metal negative electrode having two grooves in its two opposite sides formed by double bends made therein, two perforated partitions set in these grooves and dividing the interior of the negative electrode into three compartments, a porous cup and a positive electrode in the porous cup composed of a central rod and blocks of zinc strung thereon, said cup occupying the central compartment.

10. The combination of a rectangular sheet metal negative electrode having two grooves in its two opposite sides formed by double bends made therein, and double bends formed in its two ends plates of metal held in the groove formed by the double bend in its two ends, two perforated non-active partitions set in the side grooves and dividing the interior of the negative electrode into three compartments, a porous cup located in the central compartment, and a positive electrode in the porous cup, composed of an insulated supporting rod and two sets of blocks of zinc strung thereon, those of one set being cylindrical in form, and the alternate ones circular with rounded sides.

In testimony whereof I have hereunto subscribed my name.

FRANK BÄYER.

Witnesses:
FRANK S. OBER,
EDWARD C. DAVIDSON.